United States Patent [19]

Louis et al.

[11] 4,414,634
[45] Nov. 8, 1983

[54] FLUID FLOW TOTALIZER

[75] Inventors: Timothy R. Louis, Berea; Carl A. Gedeon, Middleburg Heights; Maw H. Lee, Broadview Heights; Eugene V. Erjavec, Willowick, all of Ohio

[73] Assignee: The Scott & Fetzer Company, Cleveland, Ohio

[21] Appl. No.: 284,526

[22] Filed: Jul. 17, 1981

[51] Int. Cl.³ .................. G06F 15/32; G01F 1/00
[52] U.S. Cl. .................. 364/510; 364/465; 73/861.03
[58] Field of Search .......... 364/509, 510, 465, 518; 235/92 FL; 73/861.01, 861.02, 861.03

[56] References Cited

U.S. PATENT DOCUMENTS

| | | | |
|---|---|---|---|
| 1,877,810 | 9/1932 | Chamberlain | 137/486 |
| 1,931,474 | 10/1933 | Ryder | 236/70 |
| 1,977,498 | 10/1934 | Staegemann | 73/861.44 |
| 2,264,370 | 12/1941 | Harrison | 235/61 C |
| 2,556,803 | 6/1951 | Eckman | 73/861.43 |
| 2,611,812 | 9/1952 | Hornfeck | 340/870.05 |
| 3,322,339 | 5/1967 | Nolte | 235/61 R |
| 3,407,658 | 10/1968 | Kerbow et al. | 73/861.02 |
| 3,742,515 | 6/1973 | Yeiser | 346/49 |
| 3,752,393 | 8/1973 | Moseley | 364/510 |
| 3,980,865 | 9/1976 | Messer et al. | 364/510 |
| 4,149,254 | 4/1979 | Molusis | 364/510 |
| 4,150,721 | 4/1979 | Norwood | 166/53 |
| 4,355,365 | 10/1982 | McCracken et al. | 364/510 |

Primary Examiner—Gary Chin
Attorney, Agent, or Firm—Pearne, Gordon, Sessions, McCoy, Granger & Tilberry

[57] ABSTRACT

A data totalizer for use with a fluid flow chart recorder is disclosed. The chart recorder may be for a gas well to record the flow of gas into a collection pipe and such chart recorder has a movable chart, usually a circular chart, with a first marker pen to record on the chart a static pressure within the pipe collection system and a second marker pen to record on the chart a fluid flow signal in accordance with a differential pressure across an orifice in the gas well pipe, and with first and second fluid pressure motors in the chart recorder to move the first and second marker pens. The data totalizer includes first and second linear variable displacement transformers, with linkage connected directly in the chart recorder to move in accordance with movements of the pens and connected to move the linearly displaceable elements in the two transformers. An electronic multiplier is provided to multiply together the electrical outputs of the first and second transformers to obtain a product. An electronic circuit is provided to calculate the square root of such product to obtain an electrical signal proportional to the rate of fluid flow. This signal may be multiplied by a time signal to obtain the total quantity of fluid flow, such as in cubic feet.

20 Claims, 9 Drawing Figures

FLUID FLOW TOTALIZER

BACKGROUND OF THE INVENTION

Circular chart recorders have been used for many years on gas wells to determine the flow rate and especially the quantity of gas flow to the gas collection system. An accurate record is desired because this is the means for determining how much money the well owner is paid for the gas from the well. When a well is new, the gas flow may be nearly continuous from the well into the collection pipe system, but as the well gets older, the ratio decreases markedly of on:off time of the valve regulating flow from the gas well.

The charts might be 24-hour charts, or 7- or 30-day charts and, typically, two marking pens mark lines on this circular chart, one showing static pressure in the pipe collection system and the second showing differential pressure across an orifice in the flow line to the pipe collection system. These two signals are multiplied together and then the square root is taken of the product in order to get flow rate, and this is detailed in the AGA Report No. 3, well known in the gas well industry. The charts are taken off the chart recorder, usually placed at the well head, and taken to a chart reader who usually utilizes a planimeter or other similar means to determine the area under each curve. This has been standard practice for many years, and the accuracy with which the charts are manually read determines the accuracy of payment to the well owner.

A number of different chart conditions contribute to the difficulty of accuracy of reading. For example, some charts show a solid, wide line where the pen has oscillated back and forth rapidly relative to the slow rotation of the chart, and the chart reader has to make a guess as to where the pen was located the majority of the time. Another type of chart difficult to read is a sunburst chart, where there are wide swings in the pen, and with the wide oscillations of the pen close together relative to the rotational speed of the chart. Such a chart, again, is very difficult to read accurately.

A prior art system which attempted to solve this was shown in U.S. Pat. No. 3,322,339, wherein the mechanical system was physically cionnected to the chart recorder and mechanically acted as a planimeter to calculate the area under the curves, thus not requiring a manual operator to trace over the curve on the chart. This mechanical system placed an extra load on the movement of the pen, which could cause inaccuracies due to the extra loading. Also, it had many moving parts, and lost motion at the pivot points could cause further inaccuracies.

U.S. Pat. No. 3,742,515 disclosed an analyzer for a chart recorder which utilized electrical signals to produce a triangular wave traced along the edge of the recording chart, with a frequency of this triangular wave being proportional to the amplitude of the analog signal. However, this did not obtain an electrical signal showing the total quantity of fluid flow, nor even rate of fluid flow.

U.S. Pat. Nos. 1,877,810 and 2,611,812 show gas flow recording devices which utilize variable inductances or movable core transformers responsive to the fluid pressure, and then another such inductance device, usually at a remote location for a remote recorder, to reconvert the electrical signal to a mechanical movement so as to move a recording pen on a rotatable chart. These patents disclosed a remote reading instrument, but still left unsolved the problem of how to accurately read the chart and determine the gas flow rate therefrom.

These prior art devices were subject to mechanical wear, lost motion, and temperature effects, an also included the difficulties of errors in manual chart integration. Further, they were subject to errors due to clock drive of the disc chart and pen malfunctions, and required a relatively rapidly rotating chart, e.g., a 24-hour chart instead of a 7- or 30-day chart, in order to help minimize errors in determining the quantity of fluid flow.

SUMMARY OF THE INVENTION

The problem to be solved, accordingly, is how to eliminate errors due to mechanical wear, lost motion, and temperature effects, to eliminate errors due to manual chart interpretation or chart drive and pen malfunctions, and how to utilize a longer time period chart without introducing inaccuracies. This problem is solved by a data totalizer for use with a fluid flow chart recorder, said chart recorder having a movable chart and a first marker to record thereon a first fluid pressure signal and a second marker to record thereon a second signal responsive to the fluid flow, and first and second motors to move the first and second markers, respectively, said data totalizer comprising, in combination, a first and a second linear variable displacement transformer each having an electrical output and a linearly displaceable element to vary the output, first and second connecting means connected to said first and second transformer elements and adapted to be connected to the first and second motors, respectively, calculating means connected to the electrical outputs of said first and second transformers to perform a fluid flow calculation.

The problem is further solved by a data totalizer for calculating fluid flow comprising, in combination, first and second linear variable displacement transformers, an output winding and a movable core in each transformer, first and second means to move said first and second transformer cores in accordance with the static pressure in a fluid flow line and the differential pressure across an orifice in the fluid flow line, respectively, electrical means responsive to the outputs of said output windings to perform a fluid flow calculation, and means to intermittently energize said electrical calculating means.

The problem is further solved by a data totalizer for use with a fluidd flow chart recorder having static and differential pressure motors with linkage connected to move markers on a recording chart, comprising, in combination: adaptation means and electronic calculating means; said adaptation means including conversion means to convert from mechanical motion to an electrical signal, said adaptation means including means adapted to mechanically connect said first and second movable elements to the chart recorder linkage, said conversion means including first and second electromechanical transducers each having a movable element and an electrical output, and said electronic calculating means having inputs connected to receive the electrical outputs of said transducers and connected to perform an electronic calculation to determine the rate of flow of fluid.

Accordingly, an object of the invention is to provide a data totalizer for fluid flow which is electronically calculated and the unit is directly connected to the chart recorder.

Another object of the invention is to provide a fluid flow totalizer or integrator which connects directly on the two rotating shafts in a typical chart recorder for a gas well and which has simplicity of construction and ease of adjustment for proper calibration.

A further object of the invention is to provide a battery-operated fluid flow totalizer which may be utilized out in the field and which is actuated only intermittently to conserve battery power.

A still further object of the invention is to provide a fluid flow totalizer which is not subject to wear or temperature effects and which eliminates errors in manual chart interpretation.

Another object of the invention is to provide a fluid flow totalizer for a chart recorder wherein one may use a 30-day chart on the recorder with no penalty in accuracy compared with use of a 24-hour chart.

Another object of the invention is to retrofit the existing mechanical chart recorders to convert mechanical signals into electrical signals for further data processing.

Other objects and a fuller understanding of the invention may be had by referring to the following description and claims, takin in conjunction with the accompanying drawing.

DESCRIPTION OF THE PREFERRED EMBODIMENTS

Figure 1:
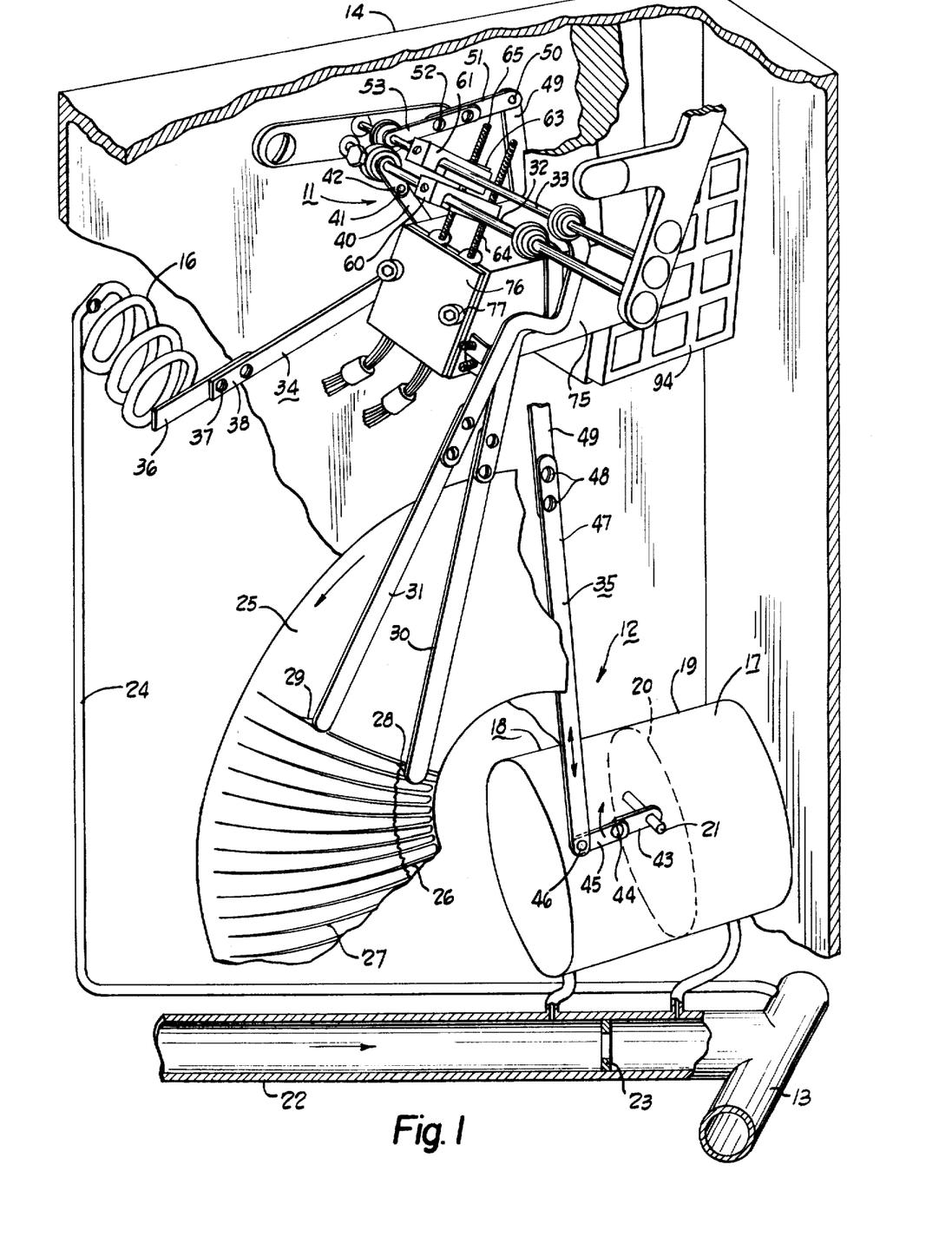
FIG. 1 is a perspective view of a chart recorder incorporating the fluid flow data totalizer of the invention.
Figure 9:
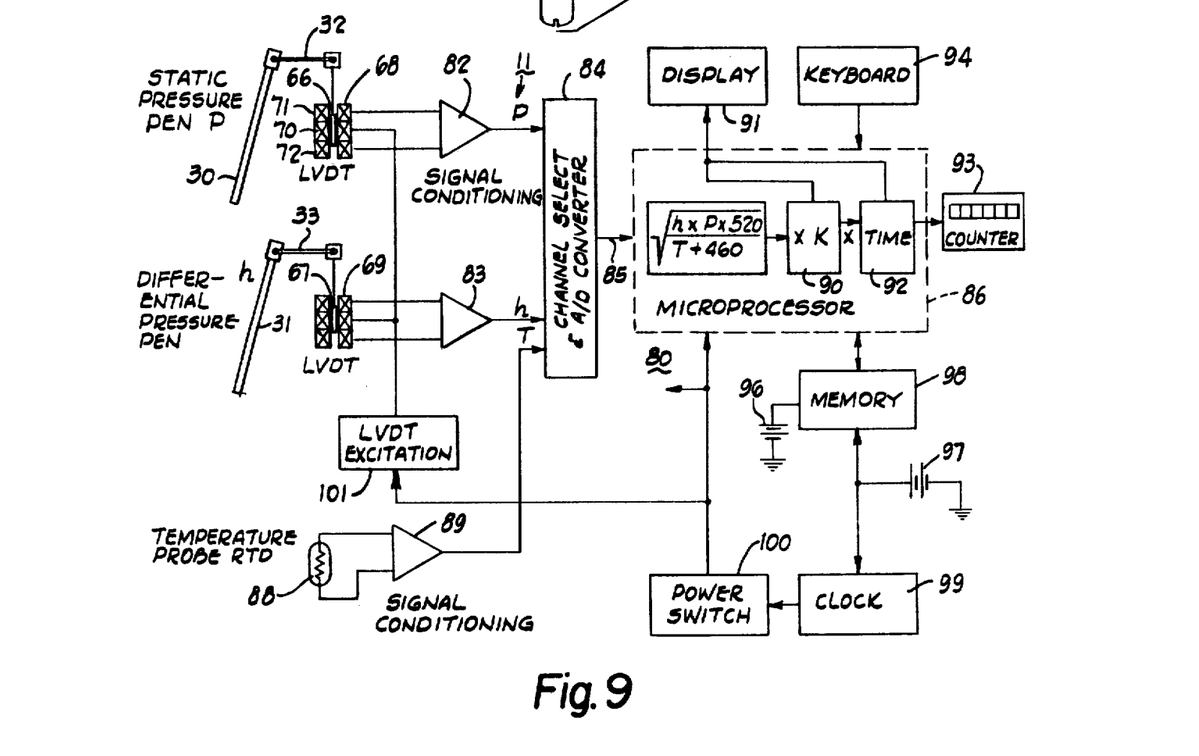
FIG. 9 is a block diagram of the electrical circuit of the data totalizer.

A data totalizer 11 includes mechanical components shown in FIG. 1, and includes electrical comonents shown primarily in FIG. 9. The mechanical components of FIG. 1 will first be described. FIG. 1 illustrates a chart recorder 12 with which the data totalizer is used. There are many such chart recorders on the market which measure fluid flow, e.g., flow of gas from a gas well to a pipe collection system 13. The chart recorder 12 has a housing 14, with first and second motors 16 and 17, respectively. The motors are ones which move with a change in fluid pressure, and these are shown as two different types. The first motor 16 may be a Bourdon tube type of motor, and the second motor 17 may be a differential pressure motor with first and second chambers 18 and 19, respectively, separated by a diaphragm 20. Movement of the diaphragm is connected by a linkage to arcuately rotate an output shaft 21. There is diagrammatically shown in FIG. 1 a fluid flow pipe 22 with fluid flow from some source such as a gas well (not shown) through an orifice plate 23 to the pipe collection system 13. The differential pressure across the orifice plate 23 is supplied to the chambers 18 and 19 and the static pressure in the pipeline collection system 13 is supplied by a conduit 24 to the first motor 16. This is a typical arrangement in the various types of chart recorders, so that there may be recorded on a circular chart 25 a marker trace 26 for the static pressure from the first motor 16 and a differential marker trace 27 from the second mootor 17. These marker traces are made by marking pens 28 and 29, respectively, carried on arms 30 and 31, respectively, which are secured for rotation with first and second shafts 32 and 33, respectively. These shafts are journaled in the housing 14, and a first linkage 34 is provided between the first motor 16 and the first shaft 32, and similarly, a second linkage 35 is provided between the second motor 17 and the second shaft 33. The first linkage 34 includes links 36 and 38 with a slotted connection secured by a screw 37, to make the total length of links 36 and 38 adjustable. Link 38 is pivoted to a link 40, which has a slotted connection and is connected by a screw 41 to another link 42, which link is secured to the first shaft 32. By loosening the screw 37 and adjusting the total length of the links 36 and 38, the zero position of the arm 30 and marker pen 28 may be adjusted. By loosening the screw 41 and adjusting the total length of the links 40 and 42, the range of movement of this marker pen 28 may be adjusted for a given movement of the Bourdon tube motor 16.

The second linkage 35 is somewhat similar, and has links 43 and 45 connected by a screw 44 for adjustment of the range of movement of the marker pen 29. Link 45 is pivoted at 46 to a link 47. Links 47 and 49 may be adjusted in length by the screws 48 to adjust the zero position of the marker pen 29. Link 49 is pivoted at 50 to a link 51, which is secured by adjusting screws 52 to a link 53, which adjustment may again be used to adjust the range of movement of the arm 31 and marker pen 29. These adjustable linkages 34 and 35 may vary from one chart recorder manufacturer to the next, but all have some form of zero adjustment and range adjustment for each of the signals from the static pressure and the differential pressure motors.

Figure 2:
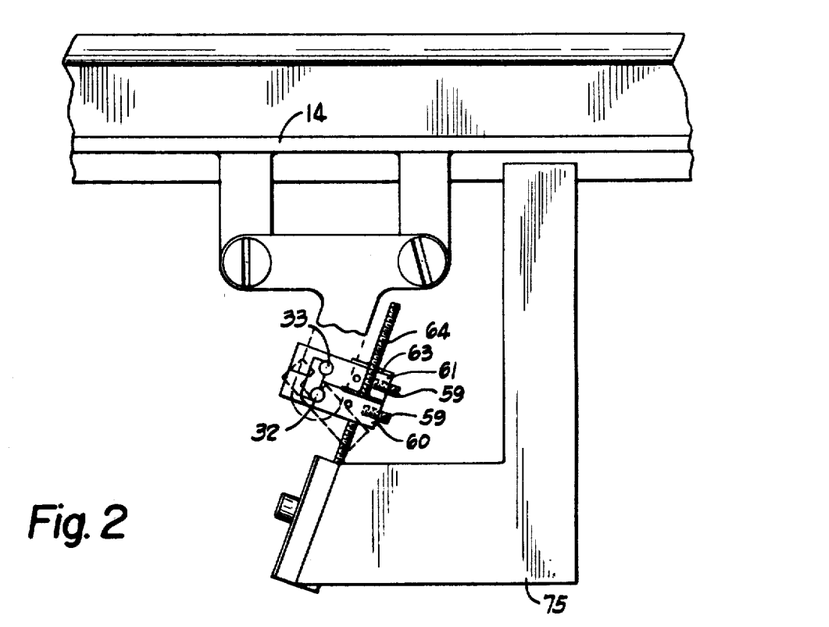
FIG. 2 is a front elevational view of the mounting of the variable transformers of the invention.
Figure 3:
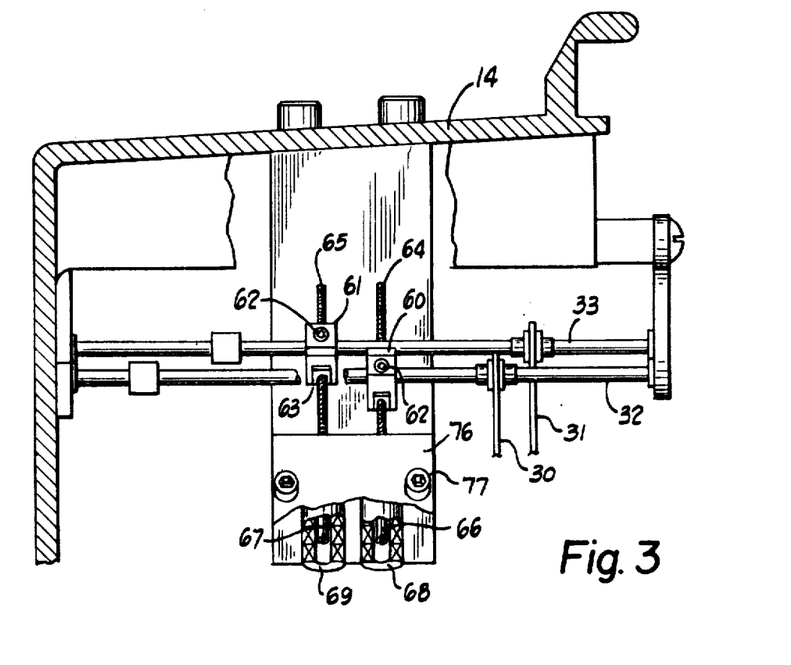
FIG. 3 is a side elevational view of the mounting of FIG. 2.

The data totalizer 11 is adapted to be mounted within the chart recorder housing 14, and to be connected to the first and second linkages 34 and 35. In the embodiments shown in FIGS. 1, 2, and 3, this connection is to the arcuately rotatable shafts 32 and 33, by means of first and second arms 60 and 61, respectively. These arms are connected to their respective shafts by means of setscrews 62. Each arm carries a pivoted block 63 with a tapped hole therein to receive first and second threaded shafts 64 and 65, respectively, and held in position by a locking setscrew 59 with a deformable tip. Shafts 64 and 65 are fixed to movable cores 66 and 67 of first and second linear variable displacement transformers 68 and 69, respectively. Each transformer has a primary winding 70 and first and second secondary windings 71 and 72, as shown in FIG. 9. The linear variable displacement transformers 68 and 69 are supported in a rigid mount 75, which in FIGS. 1, 2, and 3 is L-shaped, supported from the upper wall of the housing 14. The outer end of this rigid mount has two semicylindrical grooves to receive the generally cylindrical transformers and a plate 76 is clamped by screws 77 to secure these transformers within the grooves. Accordingly, when the shafts 32 or 33 rotate, the cores 66 or 67 are moved generally linearly to coact with the transformer windings 71 and 72.

FIG. 9 shows a block diagram of the electrical circuit 80 of the data totalizer 11. The first and second linear variable displacement transformers 68 and 69 are shown schematically with the movable cores thereof connected to be moved with arcuate movement of the shafts 32 and 33, respectively. When the movable core 66 is moved upwardly, for example, then the flux from the primary 70 is coupled more with the secondary winding 71 than with the secondary winding 72, there is, accordingly, a greater output from this secondary winding 71. The signals from the secondary windings 71 and 72 are connected in opposition and supplied to amplifier 82 for the static pressure signal and an amplifier 83 for the differential pressure signal. These signals are supplied to a channel-select and analog-to-digital converter 84. This converter has an output at 85 to electronic calculator 86 which performs multiplying and square root calculating functions on this combined signal. Where the two signals from the marker pens 28 and 29 indicate static pressure and the differential pressure across an orifice in the flow line, then the calculation may be that as set forth in the AGA Report No. 3, which is well known in the industry. The static pressure signal P, the differential pressure signal h, and the temperature signal T are fed into the A/D converter 84 and then to the electronic calculator 86 to perform the standard calculation of $$\sqrt{\frac{h \times P \times 520}{T + 460}}$$

The temperature compensation or temperature signal T may come from a temperature probe 88. For example, this may be a resistance temperature detector with the signal conditioned by an amplifier 89 and supplied to the channel-select and A/D converter 84. The square root may be multiplied by another constant K in a multiplier 90, with this signal capable of being supplied to a visual display panel 91 to display the rate of flow of the fluid. The signal may again be multiplied by another multiplier 92 to represent elapsed time so that the rate of flow may be converted into the quantity of flow, for example, in cubic feet. This may be displayed at 91 and is also supplied to a counter 93 for recording and display of this quantity. A keyboard 94 is supplied to provide an input to the electronic calculator 86.

One feature of the present invention is that the entire data totalizer may be mounted at the chart recorder, and this chart recorder may be out in the field, e.g., directly at the well head of a gas well. In such locations, electrical power from commercial power lines is usually nonexistent, and the present data totalizer is operable from a small storage battery 97. The battery continuously supplies energy to a memory 98 which is connected to the electronic calculator 86 and also to a clock 99. The clock runs continuously and intermittently energizes a power switch 100, which energizes the complete electrical circuit 80. This power is supplied to the electronic calculator 86, to all of the amplifiers, and also to the power supply 101 for the variable displacement transformers 68 and 69.

The data totalizer 11 is conveniently used with and easily connected to a chart recorder 12 which may be out in the field, e.g., a gas well field. The chart recorders 12 are of many different types, and the data totalizer 11 readily connects to many of these different types. The chart recorders utilize some form of fluid-actuated motor through linkage to rotate a shaft, and thus arcuately move marking pens 28 and 29. The data totalizer includes the linear variable displacement transformers 68 and 69, which are connected to the linkages 34 and 35 and, as shown, are connected onto the shafts 32 and 33. These connections are subsequent to the zero adjustments and range adjustments of the marker pens on the circular chart, 25, so that whatever adjustments are necessary to have the chart read the differential and static pressures accurately, these adjustments are applied to the variable displacement transformers. The threaded shafts 64 and 65 may be provided with a screwdriver slot in the end in order to relatively move the variable displacement cores 66 and 67 for a zero output from each of these transformers when the respective arm 30 or 31 has its marking pen at the zero position. Alternatively, the cores 66 and 67 may be provided with a screwdriver slot for adjustment of the core position. The setscrews 59 are tightened against the threaded shafts 64 and 65 to act as a lock screw which frictionally holds the shafts 64 and 65 in position without damage, yet permits subsequent core position adjustment. The friction lock without damage to the threads of shafts 64 and 65 is accomplished by deformable material between the threaded part of the setscrew and the threaded shafts 64 and 65. This may be by a separate plastic insert, but preferably is by a nylon tipped setscrew 59. The cores in these transformers move longitudinally very easily, with practically no friction whatever, so that there is a very minimum of additional load placed on the marker pen movement. This load is very much less than the load caused by the friction of the marking pen against the circular chart 25. Accordingly, there is no appreciable extra load or lost motion which might otherwise cause inaccuracies in the reading. The arms 60 and 61 are easily clamped to these arcuately movable shafts 32 and 33 by means of the setscrews 62, and can be adjusted in position as they are clamped, so that the arms 60 and 61 are generally perpendicular to the threaded shafts 64 and 65, respectively. In one practical embodiment of the invention as actually constructed, the movable core of the transformer is moved only 0.100 inch for a full scale movement of the respective marker pen, and hence this resulted in a highly linear electrical output from the transformer windings.

The signals representing the static pressure and differential signal and then processed in the electrical calculator 86. This may take many different forms, and such calulators exist on the market to perform this calculation according to AGA Report No. 3. For example, the 2200 series microprocessor-based calculator of Daniel Industries, Inc. may be connected to provide this calculation. Since the unit may be out in the field away from commercially available electrical power lines, the battery 97 supplies all of the power necessary, e..g., for at least a one-month period. The electrical circuit 80 conserves battery power by continuously energizing the memory 98 if this is a volatile memory, and also to continuously energize the clock 99. In case battery 97 fails, another battery 96 automatically energizes the memory so that the information can be retained. This battery 96 will last another thirty days. These two components utilize very small amounts of power and the clock 99 intermittently actuates the power switch 100. In one practical embodiment according to the invention, this energization was once every 32 seconds, and the energization lasted for less than one second. During this one-second energization, the entire circuit was powered so that the position of the marker pens 28 and 29, and thus the position of the shafts 32 and 33 at that instant, were measured by the movable cores of the transformers 68 and 69 and the calculator 86 performed the necessary electrical calculations to update the date in the memory 98.

If the circular chart 25 is a 7-day chart, then in this time duration there are 604,800 seconds, and at 32-second intervals, this results in 18,900 arcuate positions around the circular chart at which calculations of the quantity of gas flow are made. This results in a highly accurate calculation of the rate of flow of the gas, as well as total quantity of the gas flow. In fact, this is far more accurate than can be obtained by a manual operator operating a planimeter device on the circular chart 25 itself in order to try to calculate the quantity of gas flow.

Still further, the present invention permits one to use a slower rotating chart, e.g., a 7-day or 30-day chart rather than a 24-hour chart, without any penalty in the accuracy of calculations. It will be obvious that if one were to try to manually trace the chart with a planimeter, a 24-hour chart would be seven times more accurate than a 7-day chart. The 24-hour chart requires the charts to be changed daily, and, due to the undesirability of this task, there was a grat tendency until recently toward use of charts recording for longer durations. However, due to the recent great increase in the cost of gas, accuracy becomes even more important than the labor cost of changing the charts, and therefore the industry is switching to 24-hour charts for accuracy, even though it is not desirable from a manpower cost point of view.

With the present invention, a 30-day chart may readily be used and still achieve an accurate calculation of the total quantity of gas flow.

Figures 4, 5:
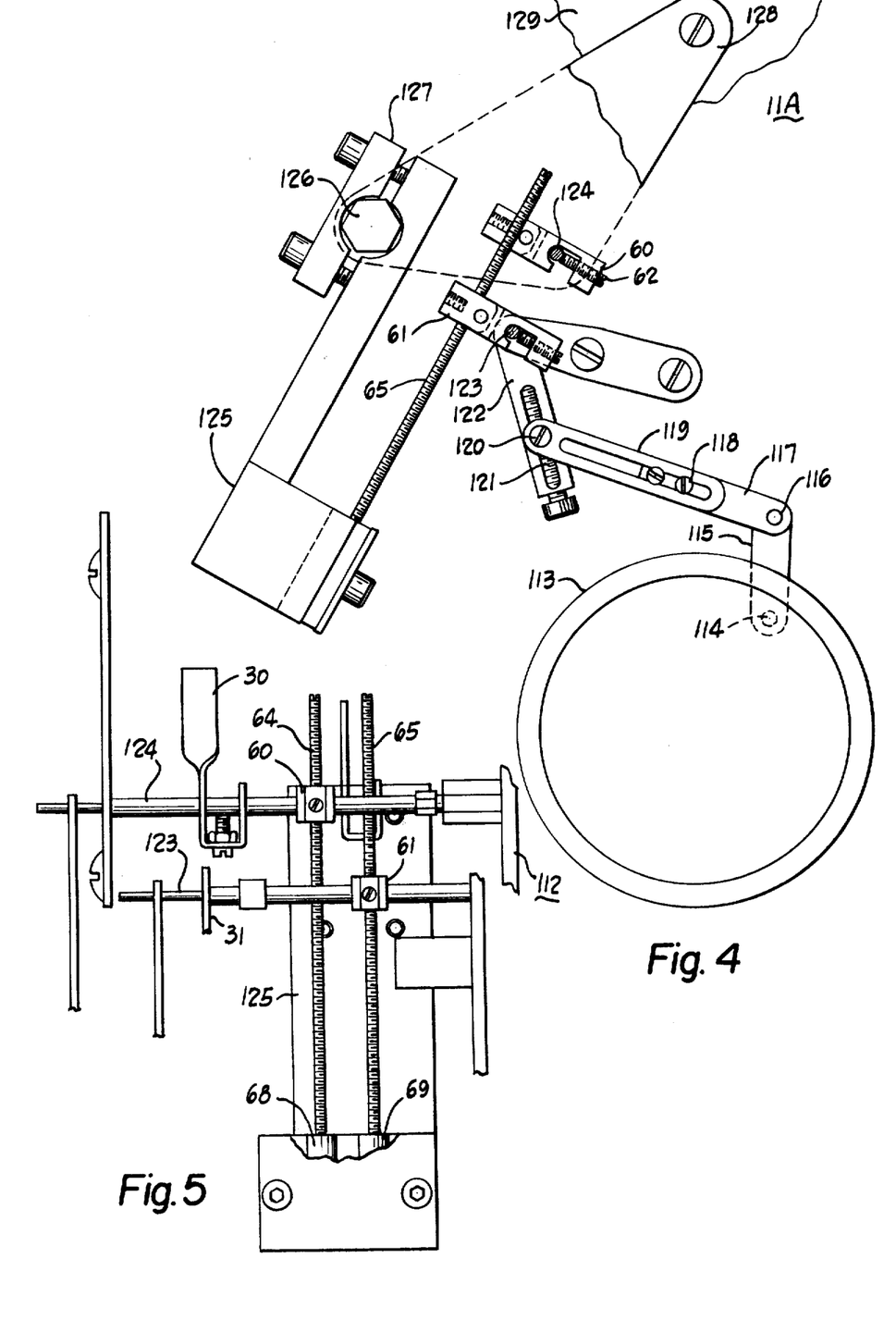
FIG. 4 is a front elevational view of the mounting of the variable transformmers in another different chart recorder.
FIG. 5 is a side elevational view of the mounting of FIG. 4.

FIGS. 4 and 5 show the data totalizer 11A as connected in a slightly different chart recorder 112. This chart recorder has a differential pressure motor 113 with an arcuately movable output shaft 114. A link 115 is pivoted at 116 to a link 117, which is adjustably connected at 118 to a link 119. This adjustment 118 provides a zero adjustment for zeroing the differential pressure arm 31 and marking pen (not shown). The link 118 is pivoted at 120 on a threaded nut, which is movable along a threadable shaft 121 in a link 122. This link 122 is secured to the differential pressure shaft 123, and the adjustment of the nut 120 on threaded shaft 121 provides the range adjustment for the differential marking pen on the chart. Similar adjustable linkage is provided from a static pressure motor to rotate the static pressure shaft 124, this mechanism also not being shown. First and second arms 60 nd 61 are connected by setscrews 62 to the static and differential pressure shafts 124 and 123, respectively, and these arms are connected through respective pivot blocks to the respective first and second threaded shafts 64 and 65. Friction-locking setscrews 59 with nylon or deformable tips secure these shafts without damage or change of calibration, and these threaded shafts are fixedly connected to the first and second movable cores 66 and 67, respectively, within the first and second linear variable displacement transformers 68 and 69. Again, these transformers are mounted within grooves, this time within a rigid mount 125, which is secured on a cross shaft 126 by a clamp plate 127. The cross shaft 126 is secured by a fixture 128 to the housing 129 for the chart recorder 112.

The arms 60 and 61 are generally perpendicular to the threaded shafts 64 and 65, and the movable cores of the linear variable displacement transformers 68 and 69 need have only about 0.100 inch of movement for a full rane of movement of the respective marker pen. A static pressure marking pen arm 30 is connected to the shaft 124 and a differential pressure marking pen arm 31 is connected to the shaft 123. These arms carry marking pens to mark on the circular chart, not shown in FIGS. 4 and 5, but similar to that shown in FIGS. 1, 2, and 3.

Figures 6, 7, 8:
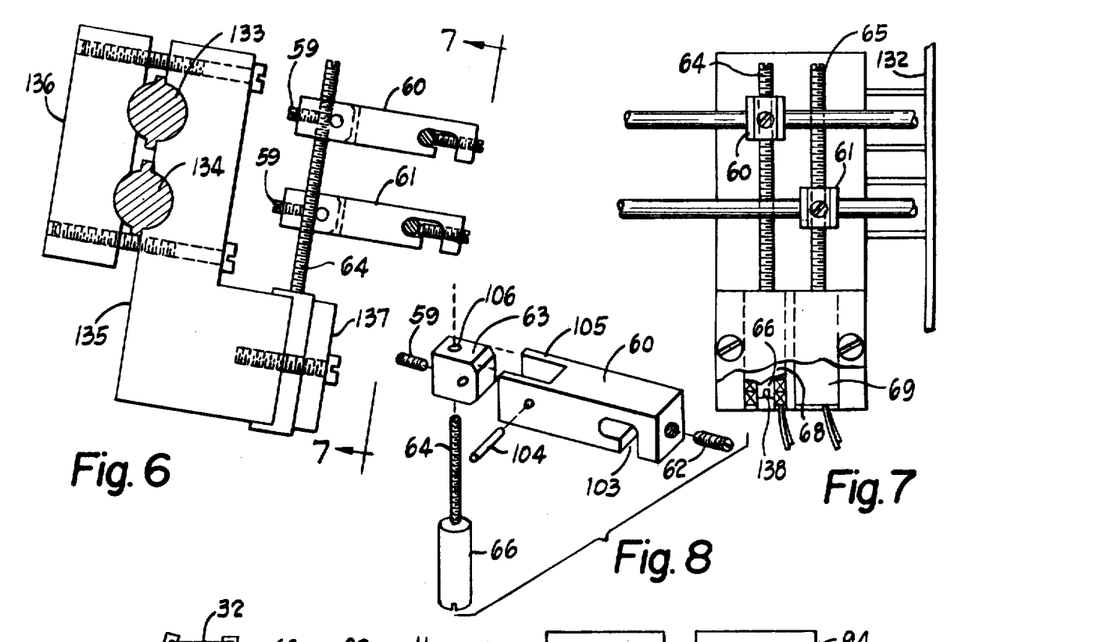
FIG. 6 is a front elevational view of the mounting of the variable transformers in still another chart recorder.
FIG. 7 is a side elevational view of the mounting of FIG. 6.
FIG. 8 is an exploded, perspective view of the arm to move the transformer element.

FIGS. 6 and 7 show a still further embodiment of how the linear variable displacement transformers 68 and 69 may be mounted within still another different type of chart recorder 132. This chart recorder has cross shafts 133 and 134 onto which a rigid block 135 is secured by a clamp plate 136. The variable displacement transformers 68 and 69 are disposed within grooves in this rigid block 135 and secured by a clamp plate 137. The threaded shafts 64 and 65 within these variable displacement transformers move the movable cores therein and are connected by arms 60 and 61 to the linkages for the static and differential pressure systems, a in the embodiment of FIGS. 1 to 3 and the embodiment of FIGS. 4 and 5.

FIG. 8 shows one arm 60, with arm 61 indentical. Arm 60 has a slot 103 to fit over the recorder shaft 32 and held in place by setscrew 62 to be generally perpendicular to the threaded shaft 64. The pivot block 63 is pivoted on a pin 104 and is received within a fork 105 of the arm 60. The threaded shaft is screwed into a threaded aperture 106 in the block 63 and held fairly snugly by the locking setscrew 59 with a nylon tip. The core 66 is secured on the end of the threaded shaft 64.

The data totalizer 11 or 11A of the three different embodiments is used with a fluid flow chart recorder, which has a movable chart and first and second markers to record thereon signals responsive to the fluid flow and to the fluid pressure. The data totalizer in each case includes a first and a second linear variable displacement transformer, each of which has an electrical output and a linearly displaceable element to vary that output. First and second connecting means are provided to connect to the first and second transformer displaceable elements and adapted to be connected to the first and second motors, which are responsive to the fluid pressure and the fluid flow, respectively. The electronic calculating means is provided to perform the proper fluid flow calculation according to AGA Report #3. Still further, electronic means is provided to multiply the square root by a constant which may be proportional to the time so as to achieve a readout of the total quantity of fluid flow.

The chart recorder in each case has adjustable linkage between the first and second motors and the first and second marker pens, with the connecting means adapted to be connected to this adjustable linkage. The adjustable linkage includes means to adjust the range of movement of the first and second marker pens, and the connecting means is adapted to be connected to first and second arcuately movable shafts, which are at a connection point subsequent to the range adjustment means. By this means, the data totalizer is automatically provided with the proper range adjustment corresponding to the adjusted range of the chart recorder with which the data totalizer is used. Further, the adjustable linkage between the motors and the marking pens in the chart recorder includes means to adjust the zero position of the first and second marker pens, and the connecting means is adapted to be connected to this adjustable linkage between the respective motor and marker pen at a point thereon subsequent to the zero adjustment means.

The data totalizer is made with few mechanical parts to have minimum wear and minimum lost motion, and hence to be highly accurate. The linear variable displacement transformers are small, and can be mounted in various ways in many different chart recorders. Once mounted and the chart recorder adjusted to zero, then these shafts on the cores may be rotated, despite the friction of setscrew 59, by a screwdriver in the slot 138 of FIG. 7 for a zero adjustment of the electrical circuit 80. The setscrew 59 should be tightened before the unit is mounted to the chart recorder because in many cases there is no access to the setscrew 59 after mounting, note FIG. 6.

The full scale movement of the cores 66 and 67 is only 0.100 inch. If after the core 66 or 67 is properly adjusted one tries to tighten the setscrews 59, the calibrated position can be effected easily. However, if the nylon tip setscrew is tightened first and then the cores 66 and 67 are adjusted, the aforementioned problem is eliminated.

The data totalizer is adapted to be connected to a chart recorder which may be located out in a gas well field or other relatively remote location at which commercial electrical power is not readily available. Accordingly, the data totalizer of the present invention includes power from two batteries, the first battery for powering the entire data totalizer, and the second battery to retain the memory information in case the first battery fails, or during the period of replacing the first battery. The second battery is trickle-charged by the first battery. Also, the present invention has the desirable feature of prolonging battery life by a constnt energization of an electronic clock and a memory which may be volatile, yet only intermittently energizing those parts of the electronic circuit which consume a greater amount of power. In one preferred embodiment of the invention, this intermittent energization was only once every 32 seconds for a period of time of less than one second. This short energization time was sufficient for totalizing the data and to update the position of the respective marker pens. The thirty-two seconds can be lengthened or shortened according to the necessary application.

The data totalizer may be incorporated into a fluid flow chart recorder at the time of manufacture, but it is especially adapted for use as a retrofit unit to retrofit those many fluid flow chart recorders already out in the field. The three embodiments of FIGS. 1, 4, and 6, plus the schematic diagram of FIG. 9 illustrates that the data totalizer of the invention includes adaptation means and electronic calculating means 86. The adaptation means includes a means to convert from mechanical motion to an electrical signal, and this conversion means includes the first and second linear variable displacement transformers 68 and 69 and the mounting blocks 75, 125, and 135, which rigidly mount the stationary part of these transformers in the various chart recorders. The adaptation means further includes the means which is adapted to mechanically connect the transformer movable elements or cores 66 and 67 to the linkage of the chart recorder 12. As shown in the preferred embodiments, this connection means to the linkage is at the arcuately movable shafts 32 and 33 for the marker pens, and such connection means includes the first and second arms 60 and 61 and the first and second threaded shafts 64 and 65. The adaptation means further includes the means to adjustably calibrate the position of the movable cores 66 and 67 and this includes the screwdriver slots 138 in the lower end of the cores 66 and 67 (FIG. 7) or in the other end of the threaded shafts 64 and 65 (FIG. 4) if this adjustment position is more convenient. The adaptation means further includes a means to fix the adjusted calibrated position of these movable cores, and this is accomplished by the deformable tip on the locking setscrews 59. This is a friction lock to secure the cores in the proper adjusted position, without damage to the threads of the threaded shafts 64 and 65.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A data totalizer for use with a fluid flow chart recorder, said chart recorder having a movable chart and a first marker to record thereon a first fluid pressure signal and a second marker to record thereon a second signal responsive to the fluid flow, and first and second motors to move the first and second markers, respectively, said data totalizer comprising, in combination:
a first and a second linear variable displacement transformer each having an electrical output and a linearly displaceable element to vary the output;
first and second connecting means connected to said first and second linearly displaceable transformer elements and adapted to be connected to the first and second motors, respectively; and
electronic calculating means connected to the electrical outputs of said first and second transformers to utilize the fluid static pressure and fluid flow signals generated by the outputs of the first and second transformers, respectively, to calculate fluid flow rate.

2. A data totalizer as set forth in claim 1, including means to multiply together the outputs of said transformers to obtain a product, and electronic means to calculate the square root of the product.

3. A data totalizer as set forth in claim 2, including means to multiply the square root by an elapsed time signal to obtain an output indicating the cubic quantity of fluid flow.

4. A data totalizer as set forth in claim 1, wherein the chart recorder has adjustable linkage between said first and second motors and said first and second markers, respectively, and said first and second connecting means are adapted to be connected to said adjustable linkage.

5. A data totalizer as set forth in claim 4, wherein said adjustable linkage includes means to adjust the range of movement of said first and second markers, and said first and second connecting means are adapted to be connected to said adjustable linkage between the respective motor and marker at a point thereon subsequent to said range adjustment means.

6. A data totalizer as set forth in claim 5, wherein said adjustable linkage includes means to adjust the zero position of said first and second markers, respectively, and said first and second connecting means are adapted to be connected to said adjustable linkage between the respective motor and marker at a point thereon subsequent to said zero adjustment means.

7. A data totalizer as set forth in claim 1, wherein the chart recorder has first and second arcuately movable shafts carrying said first and second markers and movable by said first and second motors, respectively, and said first and second connecting means are adapted to be connected to said first and second shafts, respectively.

8. A data totalizer as set forth in claim 7, wherein said first and second connecting means include first and second arms adapted to be attached to said first and second shafts, respectively, and first and second links pivoted to said first and second arms approximately perpendicularly thereto and extending to the respective displaceable elements of said first and second transformers, respectively.

9. A data totalizer for use with a fluid flow chart recorder, said chart recorder having a movable chart and a first marker to record thereon a first fluid pressure signal and a second marker to record thereon a second signal responsive to the fluid flow, and first and second motors to move the first and second markers, respectively, said data totalizer comprising, in combination:
   first and second linear variable displacement transformers;
   an output winding and a movable core in each transformer;
   first and second means adapted to be connected to said first and second motors to move said first and second transformer cores in accordance with the static pressure and fluid flow, respectively, in a fluid flow line to establish first and second signals on the respective output winding in accordance with the static pressure and fluid flow;
   electrical means responsive to the outputs of said output windings to utilize said first and second signals to perform a fluid flow rate calculation; and
   means to intermittently energize said electrical calculating means.

10. A data totalizer as set forth in claim 9, wherein said energization means includes a power supply, a clock operated from said power supply, and means for intermittently energizing said electrical calculating means from said power supply as controlled by said clock.

11. A data totalizer for use with a fluid flow chart recorder having static and differential pressure motors with linkage connected to move markers on a recording chart, comprising, in combination:
   adaptation means and electronic calculating means;
   said adaptation means including conversion means to convert from mechanical motion to an electrical signal, said conversion means including first and second electro-mechanical transducers having first and second movable elements, respectively, and each having an electrical output;
   said adaptation means including means adapted to mechanically connect said first and second movable elements to the chart recorder linkage; and
   said electronic calculating means having inputs connected to receive the electrical outputs of said transducers indicative of the static and differential pressures to perform an electronic calculation to determine the rate of flow of fluid.

12. A data totalizer as set forth in claim 11, wherein said adaptation means includes means to permit mounting of said transducers in the recorder.

13. A data totalizer as set forth in claim 12, wherein said adaptation means includes a rigid mounting block adapted to be mounted in a fixed position inside the housing of the chart recorder for mounting said transducers.

14. A data totalizer as set forth in claim 12, wherein sid adaptation means includes first and second arms adapted to be connected to arcuately movable shafts carrying the markers in the chart recorder, and first and second threaded shafts substantially perpendicular to and connected to said first and second arms, to move said first and second transducer movable elements, respectively.

15. A data totalizer as set forth in claim 11, wherein said adaptation means includes a means to retrofit a plurality of chart recorders for electronic calculation of fluid flow rate.

16. A data totalizer as set forth in claim 11, wherein said adaptation means includes means to adjustably calibrate the position of said movable elements relative to the respective transducers.

17. A data totalizer as set forth in claim 16, wherein said adaptation means includes means to fix the adjusted calibrated position of said movable elements.

18. A data totalizer as set forth in claim 11, wherein said transducers are linear variable displacement transformers.

19. A data totalizer for use with a fluid flow chart recorder, said chart recorder having first and second motors to move first and second markers, respectively, of a fluid pressure signal and a fluid flow signal, said data totalizer comprising, in combination:
   a first and a second linear variable displacement transformer each having an electrical output and a linearly displaceable element to vary the output;
   first and second connecting means connected to said first and second transformer elements and adapted to be connected to the first and second motors, respectively; and
   electronic calculating means adapted to be connected to the electrical outputs of said first and second transformers indicative of the fluid pressure signal and the fluid flow signal, respectively, to perform a fluid flow rate calculation.

20. A data totalizer for use with a fluid flow chart recorder having static and differential pressure motors with linkage connected to move markers on a recording chart, comprising, in combination:
   conversion means to convert from mechanical motion to an electrical signal;
   said conversion means including first and second electro-mechanical transducers having respective first and second movable elements and each having an electrical output;
   adaptation means including means adapted to mechanically connect said first and second movable elements to the static and differential pressure motor linkage, respectively; and
   electronic calculating means having inputs adapted to be connected to receive the electrical outputs of said first and second transducers indicative of the static and differential pressures, respectively, to perform an electronic calculation to determine the rate of flow of fluid.

* * * * *